March 8, 1955  C. B. PIERCE  2,703,695

FILLING APPARATUS FOR CONTAINERS OF FLUID

Filed May 11, 1950

INVENTOR
Clayton B. Pierce
BY
S. Stephen Baker
ATTORNEY

United States Patent Office 2,703,695
Patented Mar. 8, 1955

2,703,695

FILLING APPARATUS FOR CONTAINERS OF FLUID

Clayton B. Pierce, Portchester, N. Y., assignor to Emerol Manufacturing Co., Inc., New York, N. Y., a corporation of Illinois Application May 11, 1950, Serial No. 161,449

2 Claims. (Cl. 248—312)

This invention relates to the mounting or securing of liquid dispensers of lubricant or other fluid below the hood of an automobile or the like.

The invention has particular reference to a container for liquid lubricant or other fluid which is to be introduced into the combustion chambers of an internal combustion chamber or the like in accordance with the operating requirements of the engine. Accordingly, it is generally used in connection with a lubricating system of the type shown in U. S. Patent No. 1,183,110. As disclosed in that patent, lubricating systems of this nature include a device acted upon by the vacuum existing in the manifold of the internal combustion engine and operating to draw upon lubricant disposed in a container mounted adjacent to the engine. Most of these devices are used in automobiles which are obviously subject to considerable operating shocks and vibration.

The present invention includes brackets which are so formed and mounted as to be effective in counteracting adverse effects of such vibration. A more important function, however, of the brackets is to permit the mounting of the device, not withstanding various irregularities and diverse forms of wall or panel structure found in different types of automobile hoods. The container should be mounted upright for best results and this is often a considerable problem when the automobile hood structure is of such irregularity as to provide no suitable area where the container may be mounted. The engine and associated structure below the hood of an automobile is often of such form or configuration as to obstruct or prevent a satisfactory mounting of apparatus such as described herein. It is often necessary therefore that the mounting be adaptable to various conditions of environment in achieving a proper disposition of the container. Thus, the mounting should provide means for effectively shifting the container both vertically and horizontally to adapt it to its environment.

With the foregoing in mind, I have devised a bracket structure used in combination with a connecting collar for the container and wherein the container may be satisfactorily secured or mounted, not withstanding any heretofore encountered irregularity in the interior of automobile hood structures. The brackets are essentially triangular with a V-shape series of openings formed therethrough, any one of which may be employed in connecting the bracket to the connecting collar so that the bracket may be suitably oriented to accommodate its proper disposition for the particular car structure to which the device is to be mounted.

The invention will be further understood from the following description and drawings in which.

Figures 1, 2:
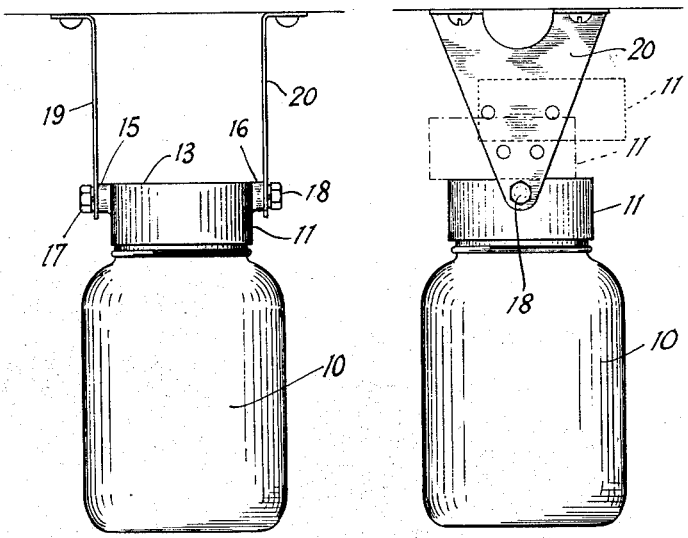
Fig. 1 is a front elevational view of a bracket mounting constructed according to the instant invention and illustrated in conjunction with a container.
Fig. 2 is a side elevational view thereof and illustrating the effect of employing alternative bracket openings for mounting the container and collar.

The bottle 10 may be approximately of a quart size or more and may contain a lubricant or any other liquid to be supplied to the combustion chambers of an internal combustion engine or the like in accordance with its operating requirements. Bottle 10 may be formed of glass if desired and has a threaded neck which is engaged by the internal threaded wall 12 of metal collar 11 which embraces the neck of the bottle. Collar 11 is essentially cylindrical and hollow and supports the vacuum operated oiler or the like on its upper annular edge 13. The oiler is not shown herein as not being necessary for an understanding of the invention. Collar 11 includes an internal annular ledge 14 which serves as a stop for the top edge of the bottle or container when it is screwed into the collar. The collar 11 is further provided with two integral bosses 15 and 16 which are formed with central bores for receiving the threaded shanks of bolts 17 and 18 employed for mounting the brackets to the collar as will be hereinafter described. Bolts 17 and 18 are disposed at diametrically opposite points of the collar 11.

A pair of brackets 19 and 20 are secured to the collar 11 through the bosses 15 and 16 by means of the bolts 17 and 18. Each of said bolts penetrate through a selected opening of a bracket so as to be received within and engaged by the corresponding central bore of either boss. A washer 21 may also be included if desired. Both of the bolts 17 and 18 are preferably right hand thread screws so as to equalize any bottle rotating effect produced through vibration as will hereinafter be explained.

Brackets 19 and 20 are triangular or V-shaped and have a pair of right angle flanges 22 and 23 formed at one side thereof for securing or mounting the brackets to a wall or other support W. The other two sides of each bracket have a series of marginal openings arranged in V form, the arms of the V being parallel to the V formed by said other two sides. Five openings 24 are illustrated although it is evident that more openings may be provided.

When the structure is to be mounted to a substantially straight overhead wall such as illustrated in Fig. 1, the apex opening of the series of openings may be employed, the bolts 17 and 18 operating through said apex openings so as to secure the collar 11 to the brackets and so that the bottle or container 10 will depend downwardly and in an upright position. However, many environments will prevent or obstruct such mounting of the container, and both a lateral and vertical adjustment of the container may be effected by selecting an appropriate one of the series of openings as partially illustrated in broken lines in Fig. 2. Thus, if the configuration of the engine or other structure is such as to ordinarily obstruct desired mounting of the bottle, it may be effectively shifted as illustrated.

Figures 3, 4:
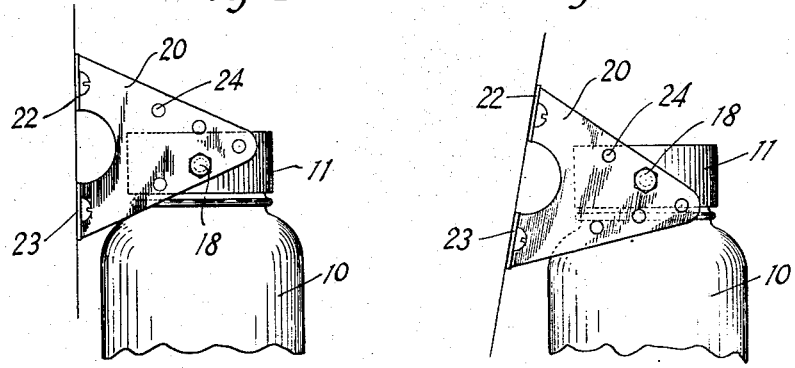
Fig. 3 is a fragmentary view illustrating the disposition of the brackets when the device is to be mounted to a vertical, straight wall.
Fig. 4 is a similar view illustrating the mounting of the device to an inclined wall.
Figure 5:
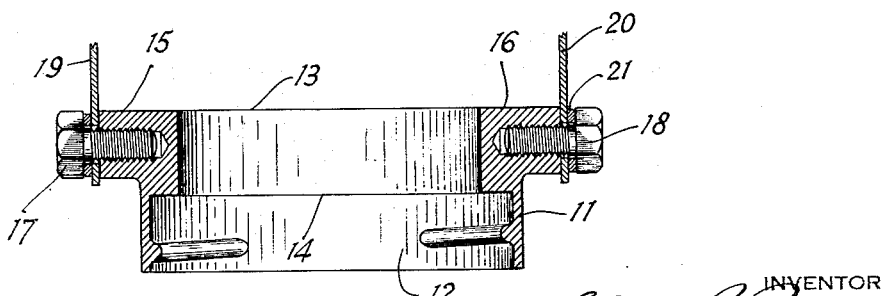
Fig. 5 is an enlarged, cross-sectional view of the collar illustrating the connection of the brackets thereto.

The bottle (and vacuum oiler, of course) may be mounted on a straight vertical wall by orienting the bracket as illustrated in Fig. 3, and further adjustments of the bottle may also be achieved. Fig. 4 illustrates mounting of the bottle against an inclined wall or support such as is often found opposite the dashboard of an automobile.

By employing similarly threaded bolts 17 and 18, it has been found that a movement of the apparatus which tends to loosen one bolt is counteracted by a tendency of the other bolt to tighten. Accordingly, practically no such accidental and undesired movement is produced, and what does occur is negligible in effect.

What is claimed is:

1. A device for mounting a container to a supporting wall, said device comprising a metal collar for connection to the mouth of the container, a pair of V-shaped brackets connected at diametrically opposite points of said collar, said brackets having means formed thereon for connecting them to the support, and each bracket being formed with a series of openings arranged in V form and including an opening at the apex of the V, each opening being selectable for connecting the bracket to said collar, said apex of the V-arranged openings being substantially coincident with the apex of the V-shaped bracket and the remaining openings being disposed along the edges of the V-shaped bracket.

2. A device according to claim 1 and wherein each V-shaped bracket comprises a pair of arms, and a perpendicular flange formed on each of said arms, said flanges being spaced from each other.

References Cited in the file of this patent

UNITED STATES PATENTS

| | | |
|---|---|---|
| 1,423,202 | Fellows | July 18, 1922 |
| 1,653,238 | Spreen | Dec. 20, 1927 |
| 1,761,218 | Lundy et al. | June 3, 1930 |
| 1,853,808 | Greenwood | Apr. 12, 1932 |
| 1,898,968 | Wyland | Feb. 21, 1933 |
| 2,024,348 | Feltman | Dec. 17, 1935 |
| 2,102,082 | Lucke | Dec. 14, 1937 |